United States Patent Office 2,899,383
Patented Aug. 11, 1959

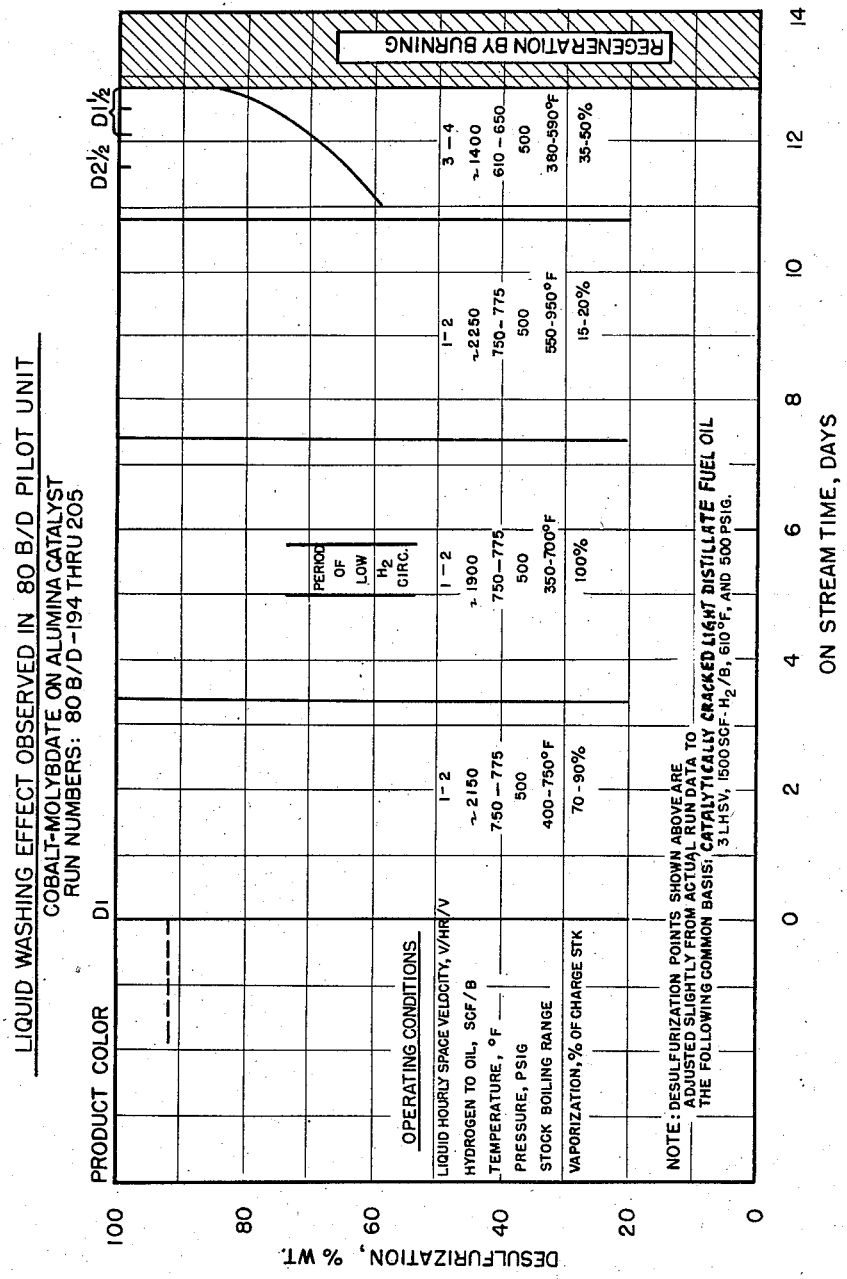

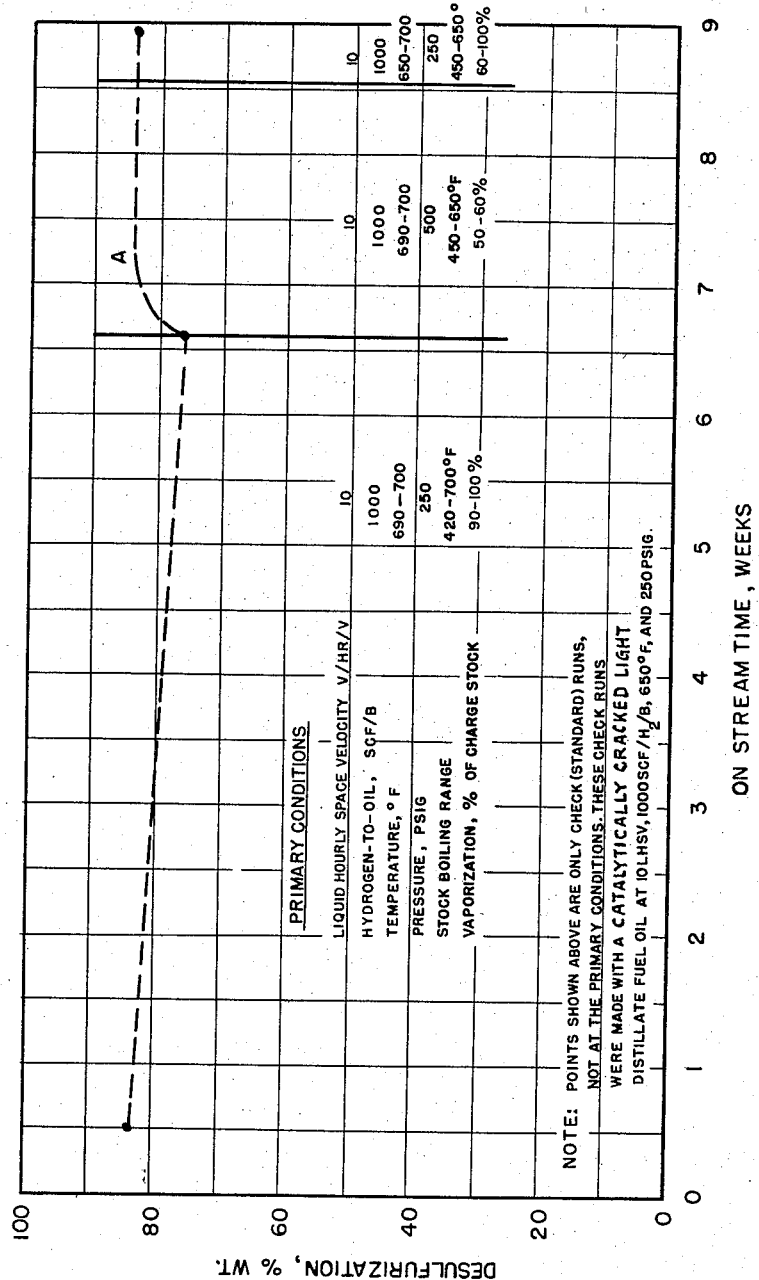

2,899,383

METHOD FOR INCREASING CATALYST ON-STREAM TIME IN A HYDROGENATION PROCESS

Donald F. Hill, West Deptford Township, Gloucester County, N.J., assignor to Socony Mobil Oil Company, Inc., a corporation of New York Application December 7, 1956, Serial No. 626,958

3 Claims. (Cl. 208—143)

The present invention relates to catalytic conversions with conditions under which a carbonaceous deposit is laid down on the catalyst which deposit tends to reduce the activity of the catalyst and, more particularly, to hydrocarbon conversions at temperatures and pressures under which a portion, at least 20 percent of the charge stock, is in the vapor state.

With the increase in the use of oil for domestic heating it has become necessary to include in the domestic heating oil greater and greater amounts of cracked oil of the domestic heating grade. This increased proportion of catalytically cracked stock has increased the amount of sediment deposited on home burner pump strainers. Several methods of treating have been suggested but the best by far is hydrogenation of the catalytically cracked light distillate or the mixture of cracked light distillate and straight run distillate fuel oil.

Since the light distillate fuel oil is a relatively cheap product of the refinery it is highly desirable to treat the material as cheaply as possible. One means of obtaining more efficient hydrogenation is to operate at pressures and temperatures under which a major portion, say 70 percent, of the light distillate is in the vapor phase. However, as the proportion of the feed to the hydrogenation reaction which is in the vapor phase increases the amount of carbonaceous material or coke deposited on the hydrogenation catalyst increases. That is to say, when less than 20 percent of the petroleum fraction to be treated is in the liquid phase under reaction conditions of temperature, pressure and hydrogen to oil ratio the deposition of carbonaceous material upon the catalyst increases to such an extent as to markedly affect the on-stream time, i.e., the time between regenerations of the catalyst. An appreciable portion of this deposit can be removed and the on-stream time considerably increased in a simple manner not involving combustion of the catalyst contaminating carbonaceous deposit. This is illustrated by the data presented in Figures 1 and 2.

Heating oil fractions of petroleum oil having boiling ranges in the range of 350°–650° F. had been hydrogenated over a cobalt molybdate catalyst for a total of about 149 days. A check run at this time at 3 liquid hourly space velocity (3 volumes liquid feed per hour per volume of catalyst) with a circulation of 1500 s.c.f. (standard cubic feet) of hydrogen per barrel of feed at 610° F. and 500 p.s.i.g. gave a 91–92 percent desulfurization of a catalytically cracked feed and a product color of D–1. Somewhat heavier stocks were treated under the more severe conditions indicated in Figure 1 for a period of about 11 days at which time the activity of the catalyst had decreased to an extent that under the check run conditions (3 LHSV, 1500 s.c.f. $H_2$/b., 610° F., 500 p.s.i.g.) the catalytically cracked feed was only desulfurized about 60 percent during the eleventh day. Reaction conditions from about 11 to 13 days were such that between 50 percent and 65 percent of the charge stock was in the liquid phase during hydrogenation. The activity of the catalyst was restored as indicated by increased desulfurization of the charge stock and improved product color. The data presented in Figure 1 are summarized in Table I.

TABLE I

| Time, Days | Actual treating conditions | | | | | | Catalyst Activity Based on Check Run Conditions [1] | |
|---|---|---|---|---|---|---|---|---|
| | Charge, BR, °F. | LHSV, v./hr./v. | $H_2$/Oil, s.c.f./b. | Temp., °F. | Pressure, p.s.i.g. | Percent in Vapor Phase | Product Color | Percent Desulfurization |
| 0–148.5 | 350–650 | Varied | Varied | Varied | 500 | Varied | | |
| 148.5–149.0 | 380–590 | 3 | 1,500 | 610 | 500 | 35 | D–1 | 92 |
| 149.0–152.5 | 400–750 | 1–2 | 2,150 | 750–775 | 500 | 70–90 | | |
| 152.5–156.5 | 350–700 | 1–2 | 1,900 | 750–775 | 500 | 100 | | |
| 156.5–159.8 | 550–950 | 1–2 | 2,250 | 750–775 | 500 | 15–20 | | |
| 159.8–160.6 | 380–590 | 3 | 1,400 | 610 | 500 | 35 | D–2½ | 64 |
| 160.6–161.1 | 380–590 | 3 | 1,400 | 610 | 500 | 35 | D–1½ | 71 |
| 161.1–161.5 | 380–590 | 4 | 1,400 | 650 | 500 | 50 | D–1½ | 75 |
| 161.5–161.8 | 380–590 | 4 | 1,400 | 650 | 500 | 50 | D–1½ | 83 |

[1] Treating a 380–590° F. charge at 3 LHSV, 1,500 s.c.f. $H_2$/b., 610° F., and 500 p.s.i.g.

These data emphasize the principles of the present invention in that, after contact of the catalyst with feed under conditions such that only 35 to 50 percent of the feed was in the vapor phase, i.e., 50 to 65 percent of the feed was in the liquid phase, the activity of the catalyst and the color of the product were restored. In other words, during the 149 to 156.5 (0 to 7.5 days in Figure 1) days of on-stream time the reaction conditions were such that about 70 to about 100 percent of the feed was in the vapor phase and the catalyst activity decreased. (Possibly due, in part at least, to low $H_2$ flow in the 154 to 154.8 day period.) Thereafter during the next about 3.4 days reaction conditions were such that 80 to 85 percent of the feed was in the liquid phase as compared to zero to 30 percent in the liquid phase during the previous 7.5 days. Activity checks could not be made in this period. The activity of the catalyst and the color of the product were steadily improved in the 159.8 to 161.8 day period with only 50 to 65 percent of the feed in the liquid phase.

In another protracted on-stream period a petroleum fraction (heating oil fraction) having a boiling range of 420–700° F. was contacted with a cobalt molybdate catalyst 10 LHSV and 700° F. at 250 p.s.i.g. with a circulation of 1000 s.c.f. of hydrogen per barrel of feed treated. Under these conditions about 90 to 100 percent of the feed was in the vapor phase in the reaction zone. Catalyst activity check runs at 650° F. were made to determine catalyst activity at the beginning of the on-stream period and at the end of 6.6 weeks. The degree of desulfurization showed that initially the feed was desulfurized to the extent of about 84 percent whereas at the end of the 6.6 week period the feed was only about 76 percent desulfurized. Thereafter, for about 4 days a similar 400–650° F. feed was treated under reaction conditions such that only about 50 to 60 percent of the feed was vaporized, 40 to 50 percent as contrasted with zero to 10 percent was in the liquid phase. During this reconditioning period, the activity of the catalyst as measured by the degree of desulfurization of the feed was restored. Subsequently, the reaction conditions were restored to the original combination of conditions and the charge stock as in the above-mentioned check runs was treated with 84 percent desulfurization of the feed. These data are graphically presented in Figure 2 and summarized in Table II.

TABLE II

| Time, Weeks | Charge, BR °F. | S/v., v./hr./v. | H₂/Oil, s.c.f./b. | Temp., °F. | Pressure, p.s.i.g. | Percent in Vapor Phase | Percent Desulfurization |
|---|---|---|---|---|---|---|---|
| 0–0.5 [1] | 450–650 | 10 | 1,000 | 650 | 250 | 60 | 84 |
| 0.5–6.1 | 420–700 | 10 | 1,000 | 690–700 | 250 | 90–100 | -------- |
| 6.1–6.6 [1] | 450–650 | 10 | 1,000 | 650 | 250 | 60 | 76 |
| 6.6–8.55 | 450–650 | 10 | 1,000 | 690–700 | 500 | 50–60 | -------- |
| 8.55–9.0 [1] | 450–650 | 10 | 1,000 | 650 | 250 | 60 | 84 |

[1] Catalyst activity check runs.

Those skilled in the art will recognize that increasing the reaction pressure after 6.6 weeks on-stream from 250 p.s.i.g. to 500 p.s.i.g. whereby the portion of the feed in the liquid phase was increased to 40 to 50 percent restored the activity of the catalyst to the original level.

Accordingly, the present invention provides for hydrogenating stocks which under the conditions of pressure, temperature and hydrogen-to-oil ratio existing in the reaction zone have 20 to 100 percent in the vapor phase and 80 to zero percent in the liquid phase until a carbonaceous deposit forms on the catalyst and then periodically hydrogenating stock under conditions of temperature, pressure and hydrogen-to-oil ratio such that the liquid volume passing over the catalyst is increased by at least 25 percent with a minimum liquid volume equal to 20 percent of the charge stock.

The amount of charge stock in the liquid phase in the hydrogenation reactor can be increased by lowering the temperature or increasing the pressure or concomitantly lowering the temperature and increasing the pressure.

One means of determining that the carbonaceous deposit is being removed from the catalyst under these conditions is the color of the liquid effluent from the hydrogenation reactor. Thus, for example, after hydrogenating a catalytically cracked distillate fuel oil having the following characteristics

|  | °F. |
|---|---|
| 10 percent point | 470 |
| 90 percent point | 560 |
| End boiling point | 610 | for 22 hours at temperatures of 650° to 794° F. and 500 p.s.i.g. in the presence of 1350 to 1700 s.c.f. (standard cubic feet) of hydrogen-rich gases/barrel under which conditions about 50–100 percent of the feed was in the vapor state, the catalyst had become contaminated with a carbonaceous deposit. Furthermore, a catalytically cracked light distillate fuel oil was hydrogenated under the conditions set forth hereinafter.

| Run No. CDS | 231A | 232A | 233A | 234A |
|---|---|---|---|---|
| Temperature, °F. | 650 | 701 | 746 | 794 |
| Pressure, p.s.i.g. | 500 | 500 | 500 | 500 |
| LHSV, v./v./hr | 2.5 | 2.5 | 2.5 | 2.5 |
| H₂:Oil, s.c.f./b. | 1,350–1,700 (1,575 Av'g.) | | | |
| Product Color | L 1½ | L 1½ | L 1½ | L 1½ |

Thereafter, the same charge stock was hydrogenated under the following conditions:

| Run No. CDS | 235A | 235C |
|---|---|---|
| Temperature, °F. | 643 | 643 |
| Pressure, p.s.i.g. | 500 | 500 |
| LHSV, v./v./hr. | 2.5 | 2.5 |
| H₂:Oil s.c.f./b. | 1,350–1,700 | (1,575 Av'g.) |
| Product Color, NPA | D5 | L5 |

Thus, during runs 232A, 233A and 234A about 75–100 percent of the feed stock was in the vapor phase and only about 0–25 percent of the feed stock was in the liquid phase.

Furthermore, it will be noted that the color of the product (D5, run 235A), during the period when 50–55 percent of the charge was in the liquid phase as compared to the color of the product (L1½, run 231A), during the period when 50–55 percent of the charge stock was also in the vapor phase is indicative that the catalyst was being freed of the carbonaceous deposit. Accordingly, the catalyst activity which had been decreased by the high temperature runs was improved during the washing.

The present invention provides for subjecting a hydrocarbon charge stock such as a light distillate fuel oil, a heavy distillate fuel oil, a short resid, a long resid, or in general a mixture of hydrocarbons (which under conversion temperature and pressure has about 0–80 percent of said mixture in the liquid phase) to conversion conditions as indicated by the equilibrium flash evaporation temperature until the carbonaceous deposit laid down upon the catalyst is excessive as indicated by a darker colored product and/or a decrease in catalyst activity, changing at least one of reaction temperature and reaction pressure to provide reaction conditions under which the liquid phase is increased by at least 25 percent with a minimum of 20 percent of the charge stock in the liquid phase, continuing to convert said charge stock under the latter conditions of reaction temperature and pressure until the color of the product is restored to the first color, and then re-subjecting the charge stock to reaction conditions of temperature and pressure under which 0–80 percent of the charge stock is again in the liquid phase.

I claim:

1. A method of converting hydrocarbons which comprises subjecting in the presence of hydrogen and a particle-form solid catalyst a charge mixture comprising a hydrocarbon mixture having an initial boiling point not less than about 350° F. and substantially devoid of added diluent hydrocarbons to first reaction conditions of temperature and pressure under which about zero to 80 percent of said charge mixture is in the liquid phase to hydrogenate said hydrocarbon mixture and thereby depositing carbonaceous material on said catalyst, continuing to subject the aforesaid hydrocarbon mixture to said first reaction conditions in the presence of hydrogen and in the substantial absence of added diluent hydrocarbons until said deposit of carbonaceous material on the catalyst becomes excessive, changing at least one of said first reaction conditions to provide second reaction conditions of temperature and pressure under which the proportion of the aforesaid charge mixture which is in the liquid phase is increased by at least 25 percent and having at least 20 percent of the aforesaid charge mixture in the liquid phase, subjecting the aforesaid charge mixture to said second reaction conditions in the presence of hydrogen and a particle-form solid catalyst until said excessive deposit of carbonaceous material on the catalyst is substantially reduced by the liquid phase material thus derived solely and created in situ from the charge mixture, changing at least one of said second reaction conditions to provide reaction conditions under which at least 20–100 percent of the aforesaid charge mixture is in the vapor phase and the balance if any is in the liquid phase, and subjecting the aforesaid charge mixture to the last-mentioned reaction conditions of temperature and pressure in the presence of hydrogen and a particle-form solid catalyst, whereby the hydrocarbon conversion is carried out with the same hydrocarbon charge mixture throughout the entire operation.

2. The method of claim 1 wherein at least 800 cubic feet of hydrogen per barrel of hydrocarbon charge mixture is introduced into the reaction zone.

3. A method of hydrogenating a charge mixture of hydrocarbons having a 10 percent point of about 380° to about 470° F., a 90 percent point of about 480° to about 625° F., and an end boiling point of about 530° to about 660° F., which comprises subjecting the aforesaid hydrocarbon mixture substantially devoid of added diluent hydrocarbons to a reaction temperature of at least about 750° F. and a reaction pressure of at least about 500 p.s.i.g. in the presence of a particle-form catalytic material and at least about 800 cubic feet of hydrogen per barrel of hydrocarbon mixture whilst about 0 to about 35 percent of the aforesaid hydrocarbon mixture is in the liquid phase until the color of the product produced becomes darker than that of the product as originally produced, and/or catalyst activity decreases, reducing the reaction temperature below 750° F. to provide reaction conditions under which the volume of the aforesaid hydrocarbon mixture which is in the liquid phase is increased to at least 20–100 percent of said hydrocarbon mixture and the balance if any is in the vapor phase, subjecting the aforesaid hydrocarbon mixture to a temperature below 750° F. in the presence of hydrogen while about 20–100 percent of the hydrocarbon mixture is in the liquid phase until the product color and/or catalyst activity is substantially improved by contact of the catalyst with the liquid phase material thus derived solely and created in situ from the charge mixture, changing said reaction temperature to a reaction temperature of at least about 750° F. to provide reaction conditions under which the volume of the aforesaid hydrocarbon mixture which is in the liquid phase is decreased so that only about 0–35 percent of said hydrocarbon mixture is in the liquid phase, and in the presence of hydrogen but in the substantial absence of added diluent hydrocarbons subjecting the aforesaid hydrocarbon mixture having only about 0–35 percent in the liquid phase to a reaction temperature of at least 750° F. and a reaction pressure of about 500 p.s.i.g., whereby the hydrocarbon conversion is carried out with the same hydrocarbon charge mixture throughout the entire operation.

References Cited in the file of this patent

UNITED STATES PATENTS

| | | |
|---|---|---|
| 2,764,528 | Sweeney | Sept. 25, 1956 |
| 2,768,936 | Anderson et al. | Oct. 30, 1956 |